US012586904B2

(12) United States Patent
Pan et al.

(10) Patent No.: US 12,586,904 B2
(45) Date of Patent: Mar. 24, 2026

(54) SINGLE-LAYER BROADBAND VERTICALLY POLARIZED ENDFIRE MAGNETOELECTRIC DIPOLE LOOP ANTENNA AND ARRAY

(71) Applicant: South China University of Technology, Guangzhou (CN)

(72) Inventors: Yongmei Pan, Guangzhou (CN); Yingzhou Tian, Guangzhou (CN); Kaixu Wang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 18/793,927

(22) Filed: Aug. 4, 2024

(65) Prior Publication Data

US 2025/0329929 A1 Oct. 23, 2025

(30) Foreign Application Priority Data

Apr. 23, 2024 (CN) ......................... 202410488625.0

(51) Int. Cl.
*H01Q 7/00* (2006.01)
*H01Q 1/38* (2006.01)
*H01Q 9/06* (2006.01)

(52) U.S. Cl.
CPC ................. *H01Q 7/00* (2013.01); *H01Q 1/38* (2013.01); *H01Q 9/065* (2013.01)

(58) Field of Classification Search
CPC .......... H01Q 1/2283; H01Q 1/36; H01Q 1/38; H01Q 7/00; H01Q 9/065; H01Q 9/16; H01Q 9/26; H01Q 9/265; H01Q 9/28; H01Q 9/285; H01Q 21/08; H01Q 23/00
See application file for complete search history.

(56) References Cited

U.S. PATENT DOCUMENTS 11,955,733 B2 * 4/2024 Luk .......................... H01Q 3/40

OTHER PUBLICATIONS

A. Li and K.-M. Luk, "Single-Layer Wideband End-Fire Dual-Polarized Antenna Array for Device-to-Device Communication in 5G Wireless Systems," in IEEE Transactions on Vehicular Technology, vol. 69, No. 5, pp. 5142-5150, May 2020 (Year: 2020).*

* cited by examiner

*Primary Examiner* — Robert Karacsony

(57) ABSTRACT

A single-layer broadband vertically polarized endfire magnetoelectric dipole (ME-dipole) antenna and an antenna array. The main radiator of this antenna is a substrate-integrated closed loop, which consists of two horizontal metallic strips printed on the upper and lower surfaces of substrate and a pair of vertical metallic vias. Excited by a double-sided parallel-strip line at the center of the loop, the metallic vias function as electric dipoles while the entire loop aperture works as magnetic dipole. To facilitate integration, this magnetoelectric dipole loop antenna is fed by an open-ended substrate integrated waveguide (SIW), which also works as a backed cavity to enhance the front-to-back ratio. Moreover, rectangular slots are etched at the edges of the SIW aperture to further improve the front-to-back ratio and also the cross-polarization performance. Thus, a vertically polarized endfire ME-dipole loop antenna with a low-profile structure, broad bandwidth, and stable radiation performance is achieved.

8 Claims, 13 Drawing Sheets

——— without slots - - - - with slots

Figure 18（a）

SINGLE-LAYER BROADBAND VERTICALLY POLARIZED ENDFIRE MAGNETOELECTRIC DIPOLE LOOP ANTENNA AND ARRAY

CROSS REFERENCE TO RELATED APPLICATIONS

The present application claims the benefit of Chinese Patent Application No. 202410488625.0 filed on Apr. 23, 2024, the contents of which are incorporated herein by reference in their entirety.

FIELD

The present application relates to the field of millimeter-wave applications, and specifically relates to a single-layer broadband vertically polarized endfire magnetoelectric dipole antenna and an antenna array.

BACKGROUND

Millimeter wave (mm-wave) communication technology has attracted widespread attention in fields such as mobile internet, unmanned vehicle, internet of things, and virtual reality, due to its rich spectrum resources, high data rate, and low latency. In particular, the frequency bands including 24.75-27.5 GHZ, 37-42.5 GHZ, and 57-71 GHz have been identified as interesting bands for the fifth generation (5G) communication. Generally, from the compatibility perspective, a multiband/broadband system is desirable to provide accessible services in different regions. Therefore, it is of great significance to investigate multiband or broadband devices including antennas. In addition, a low-profile simple structure and a stable radiation performance are equally crucial for antennas integrated into portable devices.

Compared to broadside antenna with maximum radiation perpendicular to the ground plane, endfire antenna that has maximum radiation parallel to the ground plane is proven to be more suitable for mm-wave terminal devices due to their effectiveness in mitigating hand obstruction. In recent years, a number of mm-wave wideband horizontally polarized (HP) endfire antennas have been investigated. However, vertically polarized (VP) endfire antennas are demanded when the antennas should be mounted on the metallic ground of devices, considering the fact that the ground plane can only support perpendicular electric field. As one of the most typical VP endfire antennas, quasi-Yagi Uda antennas could be integrated within a single layer dielectric substrate and have low profiles of approximately $0.1\lambda_0$ ($\lambda_0$ referring to a free-space wavelength at center frequency), but their bandwidths are limited to less than 18%. In addition, VP endfire planar horn antennas, leaky-wave antennas, and folded-slot antennas have been investigated. However, their bandwidths (<20%) are not competitive either.

The magnetoelectric dipole (ME-dipole) antenna is regarded as a very good antenna candidate for mm-wave systems due to its wide bandwidth and stable radiation performance. Recently, various broadband VP endfire ME-dipole antennas have also been put forward. However, the common drawbacks of the existing scheme while increasing the bandwidth are the need for three or even four layers of substrate, high profile, high manufacturing cost, and the improved low-profile double-layer structure has a tilted radiation pattern deviating from endfire radiation Therefore, it can be deduced that thus far designing a VP endfire antenna with low-profile structure, broad bandwidth, and stable radiation performance remains a challenge.

SUMMARY

The technical problem to be solved by the present application is to provide a single-layer broadband vertically polarized endfire magnetoelectric dipole antenna and an antenna array in response to the above mentioned defects of the prior art.

The technical solution adopted by the present application to solve its technical problem is:

- in one aspect, providing a single-layer broadband vertically polarized endfire magnetoelectric dipole antenna, for millimeter-wave applications, wherein, the antenna comprises a substrate-integrated closed loop as a main radiator of the antenna, a substrate integrated waveguide for feeding, two parallel-strip lines for connecting the substrate-integrated closed loop and the substrate integrated waveguide, substrate-integrated closed loop, the substrate integrated waveguide and the parallel-strip lines are arranged in one single layer dielectric substrate;
- the substrate-integrated closed loop is a magnetoelectric dipole structure composed of two horizontal metallic strips and a pair of first vertical metallic vias, the first vertical metallic via extends vertically along the thickness direction of the substrate, the two horizontal metallic strips are symmetrically disposed on upper and lower surfaces of the substrate, the first vertical metallic vias are connected between an upper and lower directly opposite ends of the two horizontal metallic strips, the horizontal metallic strip is connected to the substrate integrated waveguide through one parallel-strip line;
- excited by the two parallel-strip lines, the first vertical metallic vias function as electric dipoles while the radiation aperture of the entire substrate-integrated closed loop is equivalent to a magnetic dipole, generating endfire radiation.

Further, in the single-layer broadband vertically polarized endfire magnetoelectric dipole antenna of the present application, the open-ended of the substrate integrated waveguide connected with the parallel-strip line serves as a feeding and a backed cavity for enhancing a front-to-back ratio of the antenna.

Further, in the single-layer broadband vertically polarized endfire magnetoelectric dipole antenna of the present application, the substrate integrated waveguide comprises two layers of apertures provided on an upper and lower surfaces of the substrate and two rows of second vertical metallic vias connected between the two layers of the apertures;

- the thickness direction of the substrate is defined as a y-axis direction, a z-axis direction, a x-axis direction and said y-axis direction are two and two perpendicular to each other, an extension direction of the horizontal metallic strip and an extension direction of the aperture close to a boundary of the horizontal metallic strip are all parallel to the x-axis direction; an extension direction of the parallel-strip line and an arrangement direction of each row of the second vertical metallic vias are parallel to the z-axis direction; the two rows of the second vertical metallic vias are spaced apart and aligned in the x-axis direction; the z-axis direction is perpendicular to the x-axis direction and both are perpendicular to the y-axis direction; the parallel-strip line is connected to a center position of the horizontal metallic strip.

Further, in the single-layer broadband vertically polarized endfire magnetoelectric dipole antenna of the present application, the boundary of the aperture is recessed towards a facing direction departing from the horizontal metallic strip to form a pair of rectangular slots located on both sides of the parallel-strip line to further enhance the front-to-back ratio and cross-polarization performance of the antenna.

Further, in the single-layer broadband vertically polarized endfire magnetoelectric dipole antenna of the present application, two side edges of the parallel-strip line parallel to the z-axis direction are flush with inner side edges of a pair of the rectangular slots, the inner side edges being the side edges of the rectangular slots parallel to the z-axis direction and close to the other rectangular slots.

Further, in the single-layer broadband vertically polarized endfire magnetoelectric dipole antenna of the present application, the horizontal metallic strip as well as the parallel-strip line are each symmetrical about a first plane, the first plane being a plane of symmetry between two rows of the second vertical metallic vias.

Further, in the single-layer broadband vertically polarized endfire magnetoelectric dipole antenna of the present application, a length of the horizontal metallic strip in the x-axis direction is equal to twice the height of the first vertical metallic via in the y-axis direction.

In the second aspect, an antenna array is provided, which comprises multiple antennas arranged in a row as above, all of which are based on the same single layer dielectric substrate.

The present application of a single-layer broadband vertically polarized endfire magnetoelectric dipole antenna and an antenna array has the following beneficial effects: it utilizes only a single layer dielectric substrate, with a designed substrate-integrated closed loop as the main radiator, and a substrate integrated waveguide for feeding; the substrate-integrated closed loop and the substrate integrated waveguide are connected by parallel-strip lines; under excitation from the parallel-strip lines, the first vertical metallic vias of the substrate-integrated closed loop function as an electric dipole, while the radiation aperture of the entire substrate-integrated closed loop functions equivalently as a magnetic dipole radiator; therefore, a wideband magnetic dipole complementary structure complementary broadband ME-dipole structure is constructed on a single-layer substrate, generating endfire radiation, and a vertically polarized endfire antenna with a low-profile structure, broad bandwidth, and stable radiation performance is achieved.

Furthermore, for integration convenience, the proposed ME-dipole loop is fed by an substrate integrated waveguide, and this waveguide can also serve as a backed cavity to enhance the front-to-back ratio of the antenna. Additionally, rectangular slots can be designed at the edges of the aperture of the substrate integrated waveguide, distributed on both sides of the parallel-strip lines, to further improve the front-to-back ratio and cross-polarization performance of the antenna.

BRIEF DESCRIPTION OF THE DRAWINGS

To better illustrate embodiments of the present application or technical solutions in the prior art, a brief introduction will be given below regarding the drawings required for embodiments or descriptions of the prior art used. It is evident that the drawings described below are merely embodiments of the present application, and ordinary skilled artisans in the field may obtain additional drawings based on the provided drawings without exercising inventive effort:

FIG. 7 (*b*) is a schematic diagram of simulation current and electric field distribution on the substrate-integrated closed loop at a center frequency of 55 GHz in x-z plane;

FIG. 7 (*c*) is a schematic diagram of simulation current and electric field distribution on the substrate-integrated closed loop at a center frequency of 55 GHz in y-z plane;

FIG. 9(*b*) shows the simulation reflection coefficient of the antenna under different h conditions;

FIG. 10(*b*) shows the radiation performance of the antenna under different $l_1$ conditions;

FIG. 10(*c*) shows the gain of the antenna under different $l_1$ conditions;

FIG. 10(*d*) shows the FTBR of the antenna under different $l_1$ conditions;

FIG. 11(*b*) shows the SI loop radiation aperture of the antenna at 55 GHZ;

FIG. 16(*b*) shows the normalized radiation patterns of the V-band prototype at 50 GHz;

FIG. 16(*c*) shows the normalized radiation patterns of the V-band prototype at 60 GHz;

FIG. 18(*b*) shows the simulated reflection coefficients of Ports 5-8;

FIG. 19(*b*) shows the geometry of SIW 1-8 feeding networks used for V-band;

FIG. 22(*b*) shows the normalized radiation patterns of the V-band array prototype at GHz;

FIG. 22(*c*) shows the normalized radiation patterns of the V-band array prototype at 60 GHz.

DETAILED DESCRIPTION OF THE PREFERRED EMBODIMENT

For a better understanding of the present application, a more comprehensive description will be provided with reference to the accompanying drawings. The drawings depict typical embodiments of the present application. However, the present application can be implemented in many different forms and is not limited to the embodiments described herein. On the contrary, the purpose of providing these embodiments is to enhance the thoroughness and comprehensiveness of the disclosure of the present application. It should be understood that the specific features of the embodiments of the present application are detailed explanations of the technical solutions disclosed herein, rather than limitations thereof. Accordingly, embodiments of the present application and the technical features thereof described in the embodiments can be combined with each other unless they conflict.

Figure 1:
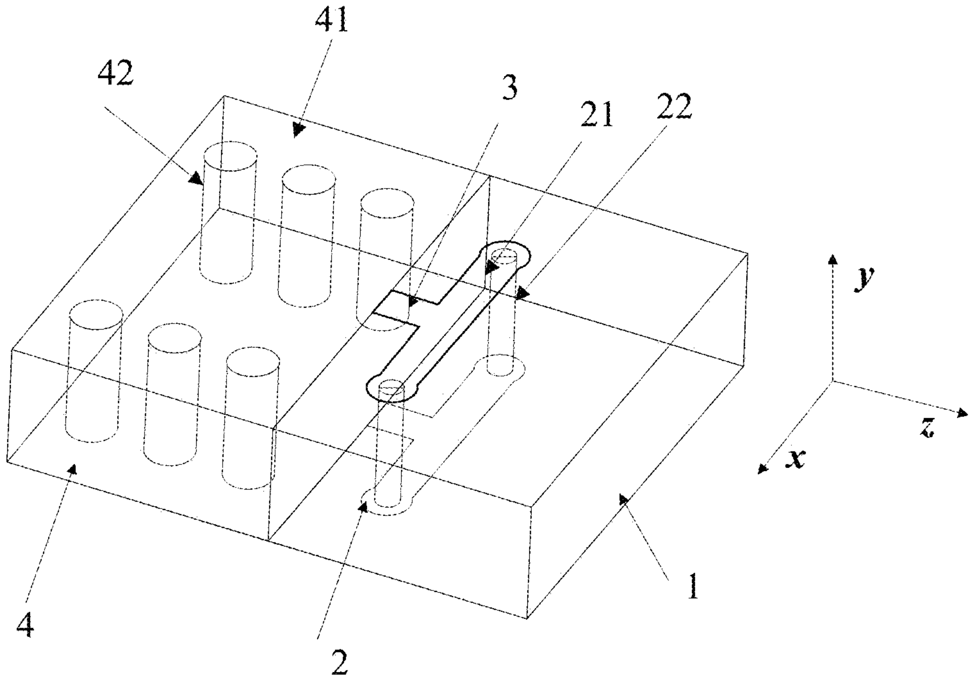
FIG. 1 is a schematic diagram of the structure of the single-layer broadband vertically polarized endfire magnetoelectric dipole antenna according to the present application.

Referring to FIG. 1, the single-layer broadband vertically polarized endfire magnetoelectric dipole antenna of the present application is for millimeter-wave applications. The antenna comprises a substrate-integrated closed loop 2 as a main radiator of the antenna, a substrate integrated waveguide 4 for feeding, two parallel-strip lines 3 for connecting the substrate-integrated closed loop 2 and the substrate integrated waveguide, substrate-integrated closed loop 2, the substrate integrated waveguide 4 and the parallel-strip lines 3 are arranged in one single layer dielectric substrate 1.

For integration purposes, the proposed ME-dipole loop is fed by a substrate integrated waveguide, and this waveguide can also serve as a backed cavity to enhance the front-to-back ratio of the antenna. Specifically, the substrate integrated waveguide 4 comprises two layers of apertures 41 provided on an upper and lower surfaces of the substrate 1 and two rows of second vertical metallic vias 42 connected between the two layers of the apertures 41. The thickness direction of the substrate 1 is defined as a y-axis direction, a z-axis direction, a x-axis direction and said y-axis direction are two and two perpendicular to each other, an extension direction of the aperture 41 close to a boundary of the horizontal metallic strip 21 is all parallel to the x-axis direction. An arrangement direction of each row of the second vertical metallic vias 42 are parallel to the z-axis direction; the two rows of the second vertical metallic vias 42 are spaced apart and aligned in the x-axis direction.

Specifically, the substrate-integrated closed loop 2 is a magnetoelectric dipole structure composed of two horizontal metallic strips 21 and a pair of first vertical metallic vias 22. The two horizontal metallic strips 21 are symmetrically disposed on upper and lower surfaces of the substrate 1, an extension direction of the horizontal metallic strip 21 is parallel to the x-axis direction. The first vertical metallic via 22 extends vertically along the thickness direction of the substrate 1, that is extending along the y-axis. Between the aligned upper and lower ends of the two horizontal metallic strips 21, a first vertical metallic via 22 is connected. To achieve this, the ends of the horizontal metallic strips 21 are designed to be circular. Each horizontal metallic strip 21 is connected to the aperture 41 of the substrate integrated waveguide 4 via a parallel-strip line 3.

Specifically, the extension direction of the parallel-strip line 3 is parallel to the z-axis direction. The parallel-strip line 3 is connected to a center position of the horizontal metallic strip 21. the horizontal metallic strip 21 as well as the parallel-strip line 3 are each symmetrical about a first plane, the first plane being a plane of symmetry between two rows of the second vertical metallic vias 42.

Excited by the two parallel-strip lines 3, the first vertical metallic vias 22 function as electric dipoles while an radiation aperture of the entire substrate-integrated closed loop 2 is equivalent to a magnetic dipole, generating endfire radiation.

Figure 2:
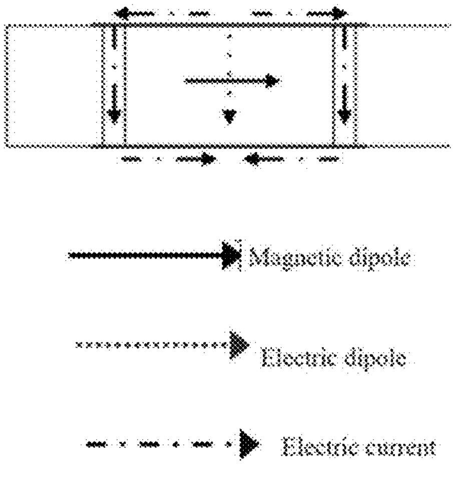
FIG. 2 is a schematic diagram of the magnetic dipole antenna in FIG. 1.

Referring to FIG. 2, it can be observed that the metallic vias 22 also have a vertical current distribution. Obviously, this current cannot contribute to radiation since these metallic vias entirely act as closed sidewalls of rectangular waveguide. The current on the metallic vias 22 will radiate effectively as electric dipoles. In this case, the complementary ME-dipole structure can be constructed within just a single-layer dielectric substrate 1, decreasing the profile, design complexity, fabrication cost of the antenna significantly. Having the SI ME-dipole radiator, the next important question is how to effectively and accurately excite it. It is found that if excited by the SIW aperture via near-field coupling, the ME-dipole could not radiate effectively. To solve this problem, a section of parallel-strip line 3 is introduced to connect the feeding substrate integrated waveguide 4 to the radiating substrate-integrated closed loop 2. This scheme has great advantages such as 1) the planar structure of antenna is retained, 2) the fabrication of the entire antenna can be implemented using a single-layer substrate via the very mature printed circuit board (PCB) processing technology, and 3) a horizontal magnetic-dipole source and a vertical electric dipole source can be excited simultaneously at the loop aperture with appropriate amplitude and phase as demonstrated below, thus realizing endfire radiation.

A specific embodiment is described below.

Figure 3:
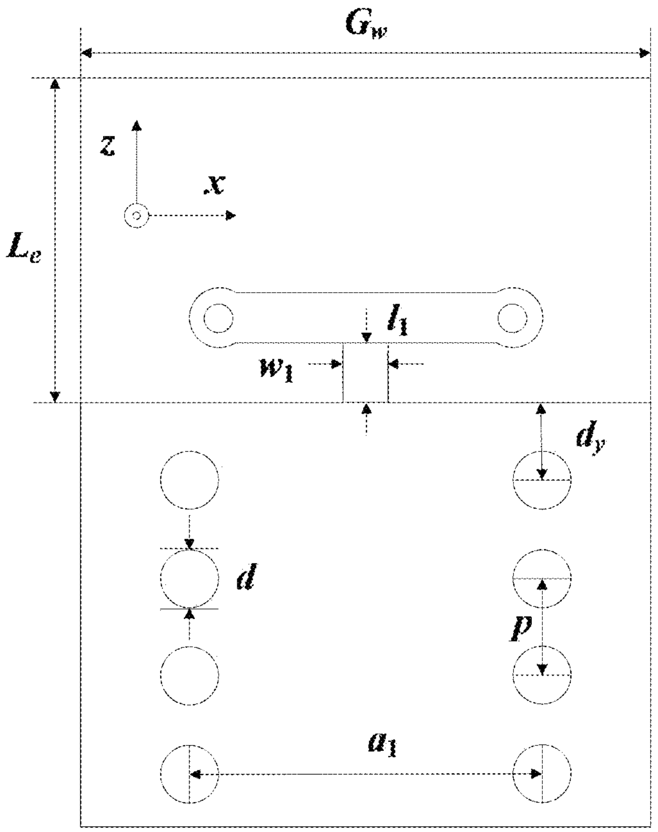
FIG. 3 is a top view of the antenna in a specific embodiment.
Figure 4:
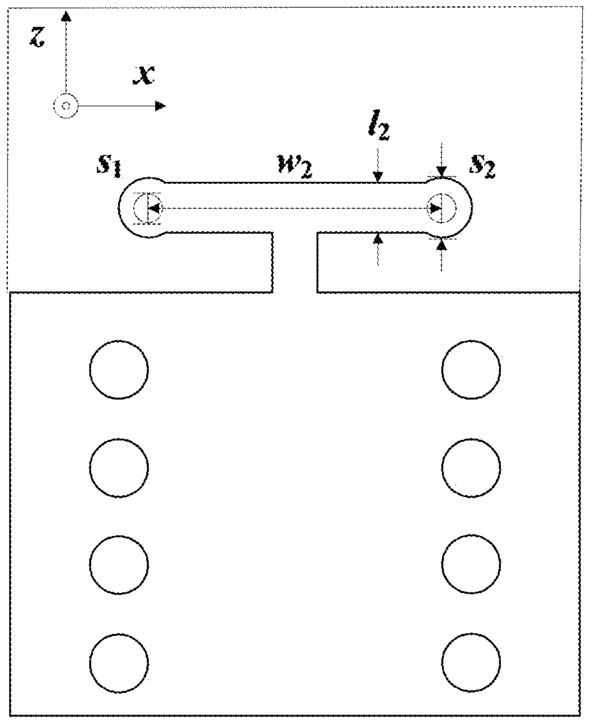
FIG. 4 is a bottom view of the antenna in a specific embodiment.

The geometric shape of the antenna is shown in FIG. 1, with specific parameters listed in Table 1. The meanings represented by these parameters can be understood in conjunction with FIGS. 3-4. Prior to physical fabrication, optimal parameter values are determined through simulation design. The simulation design process generally proceeds as follows:

1) Design the annular substrate-integrated closed loop 2. Here, the initial height of the annular structure of the substrate-integrated closed loop 2 (i.e., the size of the first vertical metallic via 22 in the y-axis direction) h is set, and the initial width of the annular structure (i.e., the size of the horizontal metallic strip 21 in the x-axis direction) $w_{2=2}h$ (specific reasons will be explained later). This means that the length of the horizontal metallic strip 21 in the x-axis direction is twice the height of the first vertical metallic via 22 in the y-axis direction.

2) Design the feeding substrate integrated waveguide 4. The main focus is on setting the key parameter $a_1$, which represents the spacing between two rows of second vertical metallic via 42 in the x-axis direction. Here, the spacing refers to the distance between the centers of the second vertical metallic vias 42.

3) Add parallel-strip line 3 to connect substrate integrated closed loop 2 and substrate integrated waveguide 4. The main task is to set its initial length $l_1$ (the size of parallel-strip line 3 in the z-axis direction).

4) Adjust $w_2$, $a_1$, and $s_2$ (where $s_2$ is the diameter of the ends of horizontal metallic strip 21) to achieve impedance matching. Simultaneously, adjust $l_1$ (the size of parallel-strip line 3 in the x-axis direction) to optimize radiation performance, including gain, front-to-back ratio, and cross-polarization levels.

5) Finally, fine-tune each parameter to enhance the overall performance of the proposed magneto-electric dipole antenna. The ultimately optimized primary antenna parameters are as follows:

TABLE 1

Table of main antenna parameters after optimization (Unit: mm)

| Parameter | Value | Parameter | Value | Parameter | Value |
|---|---|---|---|---|---|
| $G_w$ | 5.8 | $L_e$ | 3.3 | $a_1$ | 3.6 |
| d | 0.6 | p | 1 | $d_y$ | 0.8 |
| $w_1$ | 0.5 | $l_1$ | 0.6 | $w_2$ | 3 |
| $l_2$ | 0.5 | $s_1$ | 0.3 | $s_2$ | 0.6 |

Note that the feeding substrate-integrated waveguide 4 (referred to subsequently as SIW) utilizes second metallic metal vias 42 with a diameter (d) of 0.6 mm and a spacing (p) of 1 mm. The width ($a_1$) between two rows of these second vertical metallic vias 42 is set to 3.6 mm, ensuring efficient energy transfer within the desired bands (U-band and V-band).

Figure 5:
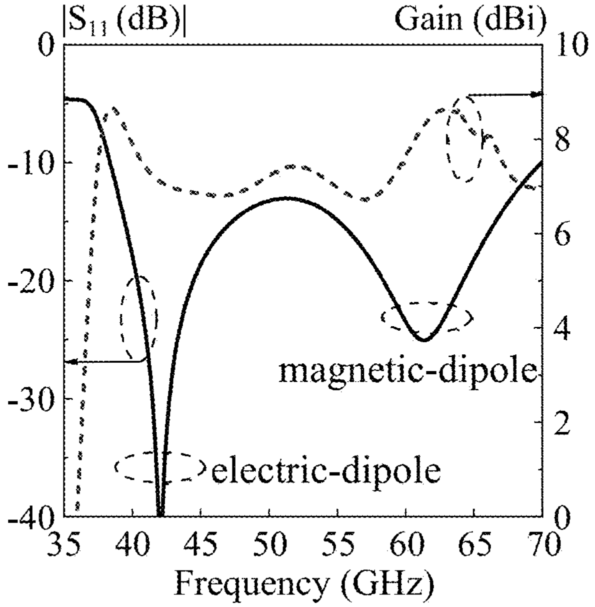
FIG. 5 shows the simulated impedance matching of the antenna in a specific embodiment.
Figure 6:
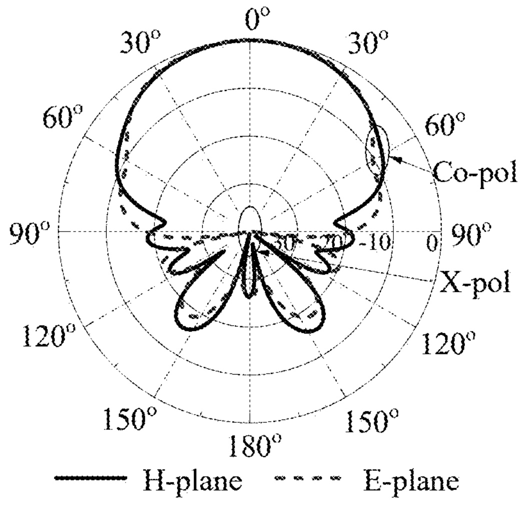
FIG. 6 shows actual radiation performance of the antenna at 55 GHz in a specific embodiment.

The simulated impedance matching and radiation performance of the proposed ME-dipole antenna are given in FIGS. 5 and 6. It can be observed from FIG. 5 that two resonant modes (as discussed below, they correspond to the electric dipole and magnetic-dipole modes respectively) are excited, leading to a broad-10-dB impedance bandwidth of 59.2% (38.0-70 GHZ). Within the impedance passband, the endfire gain varies slightly from 6.7 to 8.7 dBi, indicating that this antenna has a very stable radiation performance and the 3-dB gain bandwidth is over 60%. Moreover, as shown in FIG. 6, the radiation patterns in the H-plane (ϕ=0°) and E-plane (ϕ=90°) are almost identical, and both present good shape with a FTBR of over 25 dB and a cross-polarization level of less than −40 dB.

Figure 7:
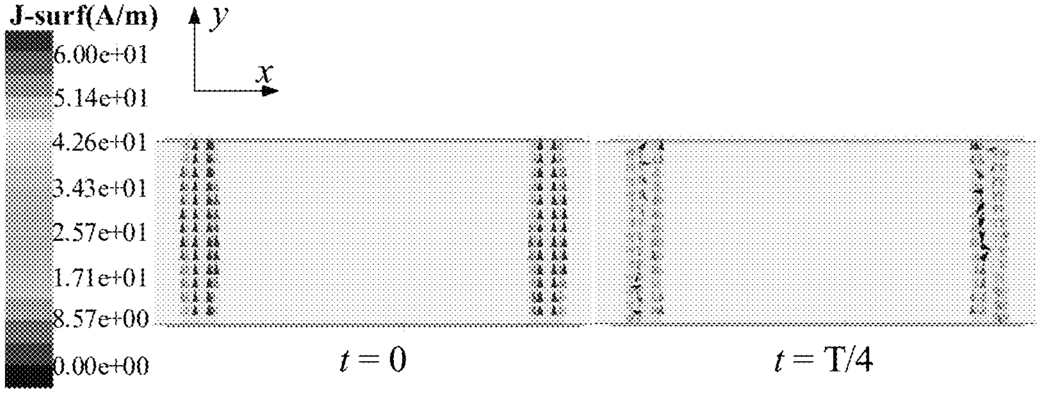
FIG. 7 (*a*) is a schematic diagram of simulation current and electric field distribution on the substrate-integrated closed loop at a center frequency of 55 GHz in x-y plane.
Figure 7:
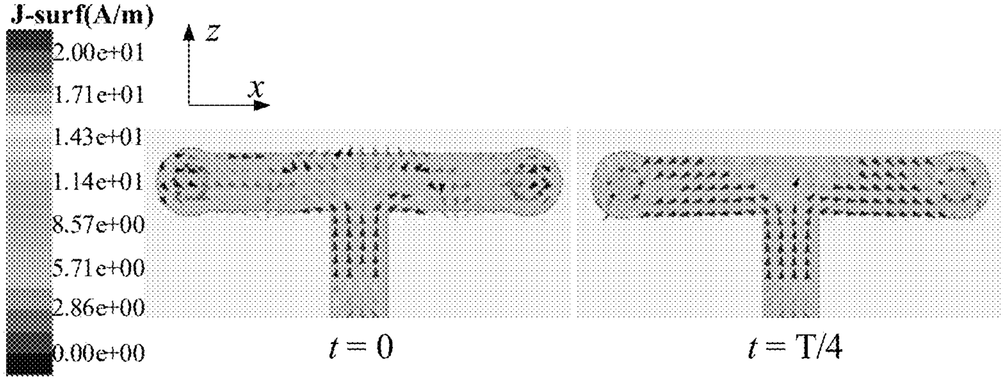
Figure 7:
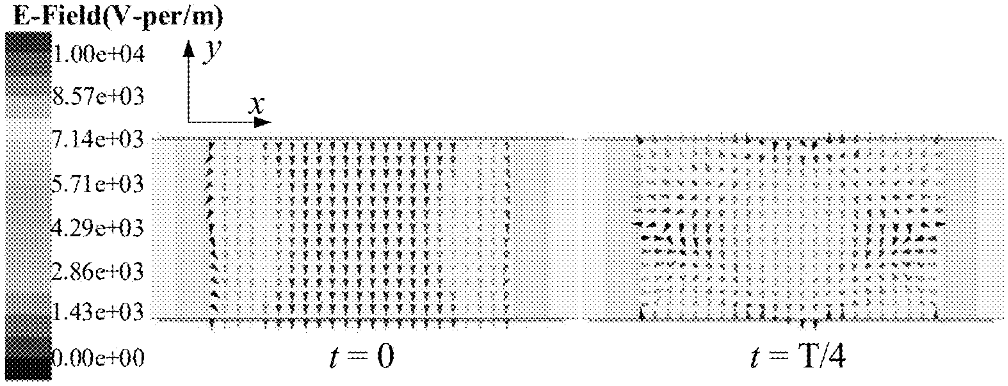

To illustrate the operating mechanism of the proposed antenna, it can be observed from FIG. 7(*a*) that, at time t=0, the intensity of current flowing through the vertical vias is considerably strong, indicating the y-directional electric dipole is excited. At t=T/4, as shown in FIG. 7(*b*), the current intensity on the metallic strips becomes strong, but the current on the left arm and that on the right arm exhibit identical amplitude and opposite direction, suggesting the cancellation of their radiation fields. Nevertheless, at time t=0, a quasi $TE_{10}$ mode E-field distribution can be observed across the loop aperture in FIG. 7(*c*), which indicates a magnetic-dipole along the x-axis is excited. Due to the in-phase excitation of the y-directional electric-dipole and x-directional magnetic-dipole, endfire radiation directing to the z-axis is obtained as demonstrated above.

More rigorously, referring to FIG. 7(*c*), the E-field at the loop aperture can be expressed as (1):

$$\vec{E} = \vec{y}E_o \sin\left(\frac{\pi x}{w_2}\right); \tag{1}$$

Then, according to the Maxwell equation $\nabla\times\vec{E}=-j\omega\mu\vec{H}$, the H-fields can be obtained as:

$$\vec{H} = -\vec{x}j\frac{w_2}{\eta\pi}E_o \sin\left(\frac{\pi x}{w_2}\right) + \vec{z}j\frac{1}{\eta}E_o \cos\left(\frac{\pi x}{w_2}\right); \tag{2}$$

Where η is the wave impedance of free space.

Next, the equivalent magnetic current on the SI loop aperture can be obtained by using $\vec{n}\times\vec{E}=-\vec{J}_m$:

$$\vec{J}_m = \begin{cases} -\vec{x}E_o \sin\left(\frac{\pi x}{w_2}\right) = -\vec{x}E_o, & x = \frac{w_2}{2} \\ 0, & \text{otherwise} \end{cases}; \tag{3}$$

Similarly, the electric currents on the metallic strips and vias of the SI loop can be obtained by applying the boundary conditions of $\vec{n}\times\vec{H}=\vec{J}_e$:

$$\vec{J}_e = \begin{cases} -\vec{y}j\frac{E_o}{\eta}, & x = 0 \\ -\vec{y}j\frac{E_o}{\eta}, & x = w_2 \\ \vec{x}j\frac{1}{\eta}E_o\cos\left(\frac{\pi x}{w_2}\right) - \vec{z}j\frac{w_2}{\eta\pi}E_o\sin\left(\frac{\pi x}{w_2}\right), & y = 0 \\ -\vec{x}j\frac{1}{\eta}E_o\cos\left(\frac{\pi x}{w_2}\right) + \vec{z}j\frac{w_2}{\eta\pi}E_o\sin\left(\frac{\pi x}{w_2}\right), & y = h \end{cases}; \tag{4}$$

Based on the above formulas, apparently the radiation of electric currents on the bottom-layer strip (at y=0 plane) and top-layer strip (at y=h plane) will cancel out each other, whereas the electric field across the loop aperture and the electric current on the metallic vias can be regarded as an x-directional magnetic dipole and a y-directional electric dipole, respectively. Since the magnetic and electric dipoles are perpendicular and decoupled to each other, their radiation far filed can be expressed individually as (5)-(8):

$$E_{m\theta} = jE_o w_2 F_m \sin\theta; \tag{5}$$

$$E_{m\phi} = jE_o w_2 F_m \cos\theta\cos\phi; \tag{6}$$

$$E_{e\phi} = -j\frac{1}{\eta}E_o h F_e \cos\theta\sin\phi\times 2; \tag{7}$$

$$E_{e\phi} = -j\frac{1}{\eta}E_o h F_e \cos\phi\times 2; \tag{8}$$

where, $F_m=ke^{-jkr}/(4\pi r)$ 且 $F_e=\eta ke^{-jkr}/(4\pi r)$;

Therefore, the total field can be simplified as follows:

$$E_T = jE_oF(w_2\cos\theta + h\times 2) \qquad \phi = 0°; \tag{9}$$

$$E_T = jE_oF(w_2 + h\cos\theta\times 2) \qquad \phi = 90°; \tag{10}$$

Figure 8:
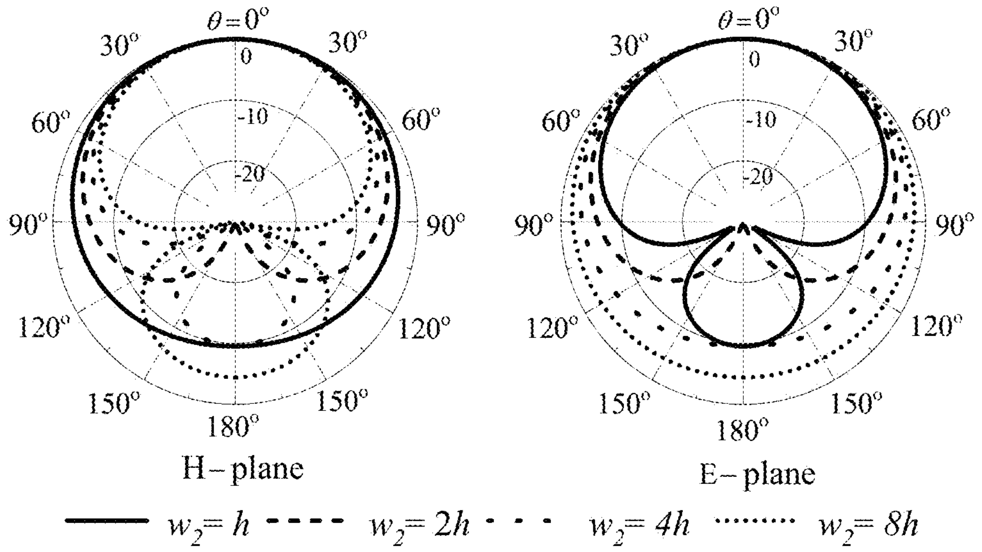
FIG. 8 is a normalized theoretical radiation pattern of the substrate-integrated closed loop at different $w_2/h$ ratios.

Using (9) and (10), the normalized radiation patterns of the SI ME-dipole loop for different aspect ratios ($w_2$/h) are drawn and presented in FIG. 8. It can be observed that when $w_2$=2h, the patterns in the H-plane and E-plane are identical, and both feature infinitely high FTBR, showing ideal endfire radiation performance. Notably, in terms of beam width and backward radiation intensity, the real patterns of the proposed antenna shown in FIG. 6 are somewhat different from the theoretical patterns shown in FIG. 8. This is mainly due to the reflection effect of the feeding SIW.

The main parameters of the antenna are studied and analyzed below.

Figure 9:
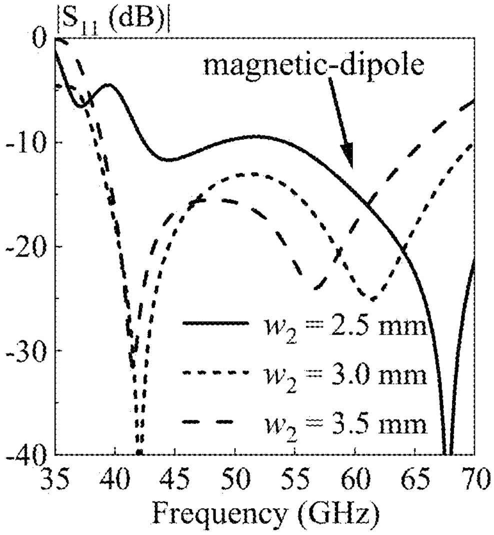
FIG. 9(*a*) shows the simulation reflection coefficient of the antenna under different $w_2$ conditions.
Figure 9:
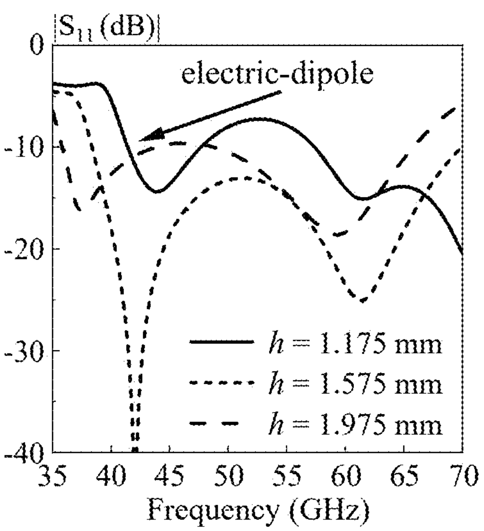

FIG. 9(*a*) presents the simulated reflection coefficients of the proposed antenna for different metallic strip widths ($w_2$). It is observed that when $w_2$ increases from 2.5 to 3.5 mm, the upper resonance shifts downwards significantly from 67.8 to 56.7 GHz while the lower resonance remains almost unchanged at 42 GHz, which is reasonable because the upper resonance is caused by the magnetic dipole and $w_2$ determines the equivalent width of the magnetic dipole. The effects of h are shown in FIG. 9(*b*). It can be seen that as height h increases from 1.175 to 1.975 mm, the frequency of the upper resonance stays at about 60 GHz but the lower resonance shifts considerably from 37.6 to 44 GHz. This is as expected because the lower resonance is caused by the electric dipole and h affects the equivalent length of the electric dipole. More importantly, it is noticed that the optimal bandwidth of 59.2% is achieved when $w_2$ is approximately 3 mm, and either increasing or decreasing $w_2$ will result in a poor impedance matching or a narrowed bandwidth. This phenomenon can be explained as follows: the ME-dipole structure in the proposed antenna is essentially an SI loop, the broad-band characteristic can be achieved under a certain geometrical condition of $\beta$=a/b=2 (a and b represent the width and height of the loop respectively). On the other hand, it is noted that the thickness of dielectric substrate used in this design is 1.575 mm. Therefore, we have $w_2/h \approx 2$ and hence an ultra-wide bandwidth. In addition, this geometrical condition for broad bandwidth is also desirably consistent with the condition for the endfire radiation pattern described in above.

Figure 10:
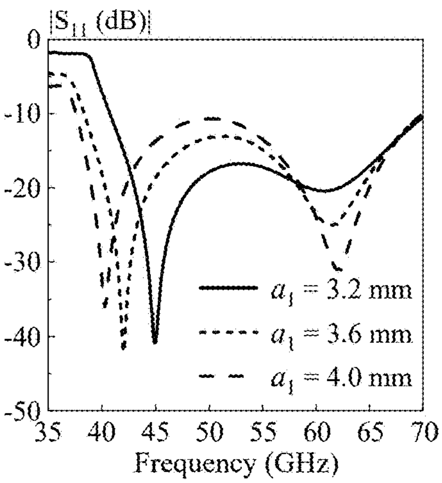
FIG. 10(*a*) shows the radiation performance of the antenna under different $a_1$ conditions.
Figure 10:
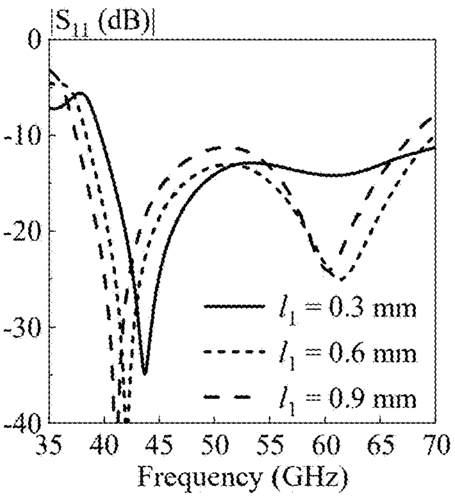
Figure 10:
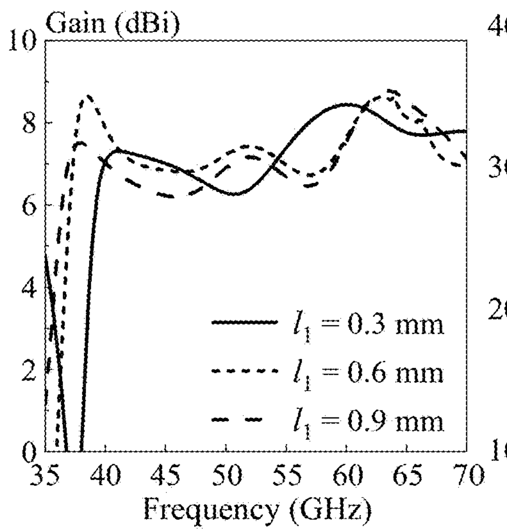
Figure 10:
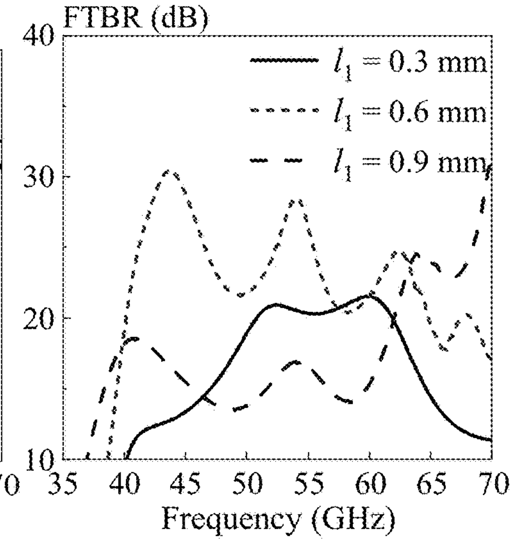
Figure 11A:
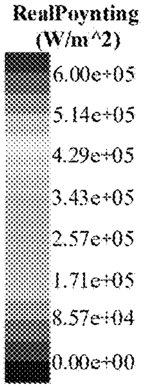
FIG. 11(*a*) shows the simulated RealPoynting vector distribution of the SIW radiation aperture of the antenna at 55 GHZ.
Figure 11A:
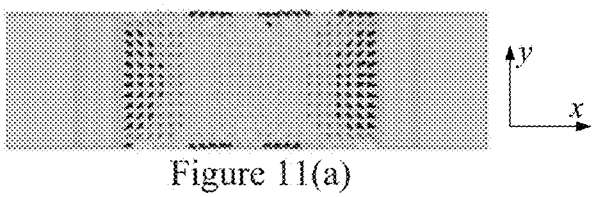
Figure 11B:
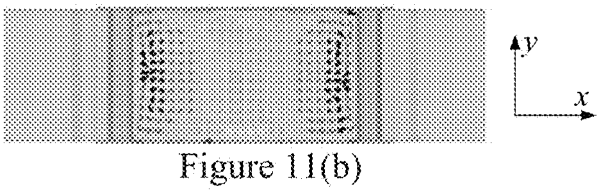

Next, the effects of the SIW aperture width $a_1$, $l_1$ are investigated in FIG. 10(*a*). It can be seen that the impedance bandwidth is narrowed to 52% when $a_1$ is reduced to 3.2 mm, due to the cut-off characteristic of SIW. However, the overall bandwidth of the proposed antenna remains almost unchanged as $a_1$ increases from 3.6 to 4.0 mm. Moreover, the results for different DSPSL lengths $l_1$ are displayed in FIG. 10(*b*). It can be observed that the input impedance is insensitive to $l_1$, and a broad bandwidth of over 58% can always be obtained when varying $l_1$ substantially from 0.3 to 0.9 mm. These results verify that the ultimate bandwidth of the proposed antenna is primarily influenced by the geometry of the SI ME-dipole loop. This is to be expected and understandable, because the SI ME-dipole loop is the main radiator while both the DSPSL and SIW aperture serve as feeding structures. FIG. 11(*a*) shows the simulated Real-Poynting vector distribution of the SIW radiation aperture of the antenna at 55 GHz. FIG. 11(*b*) shows the SI loop radiation aperture of the antenna at 55 GHz. It can be seen that the RealPoynting vector is comparable at the two places, confirming the above argument. Nevertheless, it is found that length ($l_1$) of DSPSL greatly affects the radiation performance of the antenna. FIGS. 10(*c*) and (*d*) show the endfire gains and FTBRs of the proposed antenna for different $l_1$, respectively. It can be observed that as $l_1$ decreases from 0.9 to 0.6 mm, the FTBR in the operating band increases from approximately 15 to 25 dB. Concurrently, the average endfire gain is enhanced from 5.5 to 6.5 dBi. This is because when the distance between the metallic loop (i.e., the main radiator) and the SIW is less than 0.5$\lambda_g$ ($\lambda_g$ referring to the guided wavelength), most of the backward radiation will be reflected by the SIW, which leads to a superposition of forward and backward radiation and thus an enhancement in endfire gain and FTBR. However, when $l_1$ is as small as 0.3 mm, the strong coupling between the SI loop and SIW will result in a deterioration of FTBR in the bands of 40-50 GHz and 63-70 GHz, as shown by the black solid line in FIG. 10(*d*).

Figure 12:
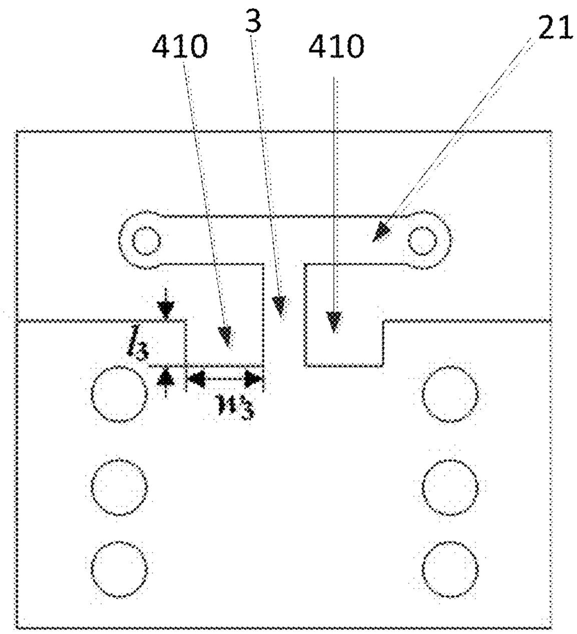
FIG. 12 is a schematic diagram of the antenna structure after adding slots.

With reference to FIG. 10(*d*), although a satisfactory FTBR of over 20 dB is achieved in nearly the entire operating band when the length of DSPSL is set to 0.6 mm. However, a rather high backward radiation with FTBR of less than 10 dB is noted at frequencies near 38 GHz. To eliminate this defect, referring to FIG. 12, the boundary of the aperture 41 is recessed towards a facing direction departing from the horizontal metallic strip 21 to form a pair of rectangular slots 410 located on both sides of the parallel-strip line 3 to further enhance the front-to-back ratio and cross-polarization performance of the antenna. The pair of the rectangular slots 410 is set on the sides of the parallel-strip lines 3. two side edges of the parallel-strip line 3 parallel to the z-axis direction are flush with inner side edges of a pair of the rectangular slots 410, the inner side edges being the side edges of the rectangular slots 410 parallel to the z-axis direction and close to the other rectangular slots 410.

It will be appreciated that the rectangular slot 410 may be directly reserved at the beginning when the aperture 41 is fabricated, or the aperture 41 may first be fabricated in accordance with the contours of FIG. 1, and then this slot may be etched by etching.

Figure 13:
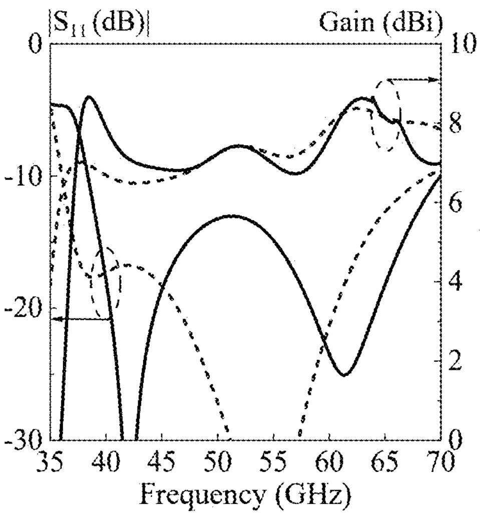
FIG. 13(*a*) and FIG. 13(*b*) shows the comparison of the performance between the antenna without and with rectangular slots.
Figure 13:
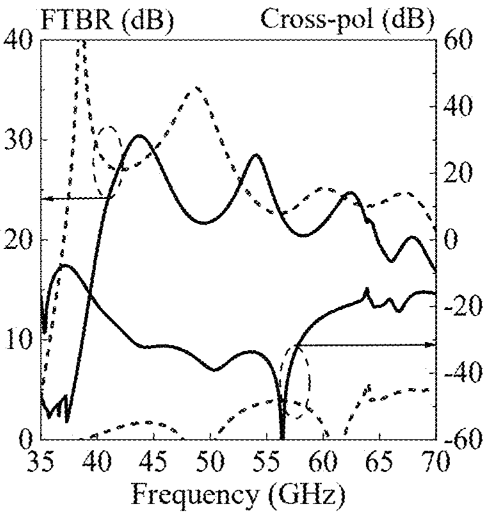
Figure 14:
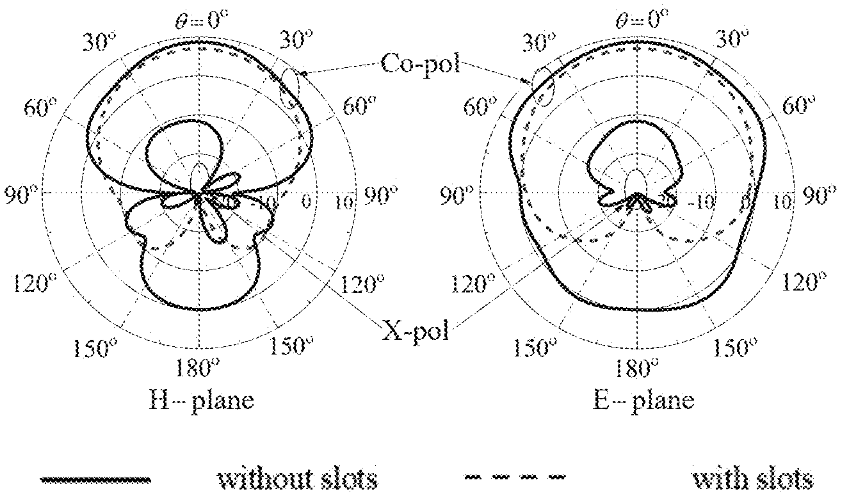
FIG. 14 shows the comparison of the Radiation patterns at 38.5 GHz between the antenna without and with rectangular slots.

A comparison between the two antennas without and with slots is displayed in FIG. 13 (*a*) and FIG. 13(*b*). As shown in FIG. 13(*a*), the slots affect considerably the input impedance and end-fire gain, but the obtained −10-dB impedance bandwidth and 3-dB gain bandwidth of the antenna with slots are basically consistent with the one without slots. Moreover, as shown in FIG. 13(*b*), the FTBR of the antenna without slots falls below 20 dB in the frequency band of 36-40 GHZ, and the average cross-polarization level in the endfire direction is approximately −30 dB. With the introduction of the rectangular slots, the FTBR of the corresponding band exceeds 20 dB and obtains a maximum value of over 40 dB at 38.5 GHz. Simultaneously, the cross-polarization level obtains significant improvement, which is basically lower than −45 dB. FIG. 14 illustrates the radiation patterns of 38.5 GHz for the antennas with and without slots. It can be observed that the antenna without slots produces an "8"-shaped pattern in H-plane and an "O"-shaped pattern in E-plane, radiating like an x-directional magnetic dipole. This is mainly because, when the electrical distance between the metallic loop and SIW aperture is small ($l_1$ is less than 0.11$\lambda_g$ at 38.5 GHZ), the SIW aperture works as the main radiator. At the same time, the metallic loop functions as a director, therefore leading to an enhanced endfire gain (see the red dashed line in FIG. 13(*a*) at 38.5 GHZ). Nevertheless, the backward radiation is still considerable. By etching the rectangular slots, the following two effects can be achieved. First, increasing the distance between SIW aperture and SI loop to around 0.25$\lambda_g$, and second, reducing the radiation amplitude and equivalent width of the SIW aperture. In this case, the metallic loop becomes the primary radiator while the SIW cavity serves as a reflector, providing high FTBR and low cross-polarization level.

Based on the above analyses, the following simple design guidelines have been summarized to facilitate the design of the proposed VP endfire ME-dipole antenna.

1) design SI loop. The initial height of the loop (i.e., vertical metallic vias 22) can be set as h=~0.25$\lambda_{g1}$ ($\lambda_{g1}$ refers to the guide wavelength at the starting frequency of the desired operating band) and the initial width of the loop (i.e., horizontal metallic strips) can be set as $w_2$=2h=0.50$\lambda_{g1}$. The length of the horizontal metallic strip 21 in the x-axis direction is twice the height of the first vertical metallic via 22 in the y-axis direction.

2) design the feeding substrate integrated waveguide 4. To ensure the energy transmission within the desired band, the key parameter a1 can be initially set as $a_1$=0.55$\lambda_{g1}$. The key parameter $a_1$ refers to the spacing between two rows of second vertical metallic vias 42 in the x-axis direction, where spacing denotes the distance between the centers of the second vertical metallic vias 42.

3) add the parallel-strip line 3 to connect the substrate-integrated closed loop 2 and substrate integrated waveguide 4. Its initial length (the length of the parallel-strip line 3 in the z-axis direction) can be chosen as $l_1$=0.125$\lambda_{g1}$.

4) etch the rectangular slots at the SIW aperture 41. The initial length and width of the slots 410 can be set as $l_3$=$w_3$=0.125$\lambda_{g1}$.

5) adjusting $w_2$, $a_1$, and $s_2$ (s2 is the diameter of the ends of horizontal metallic strip 21) to tune the impedance matching, while adjusting $l_1$ (the length of the parallel-strip line 3 in the x-axis direction) to optimize the radiation performance including gain, FTBR, and cross-polarization level.

6) Finally, fine-tuning each parameter to enhance overall performance of the proposed ME-dipole antenna. The final parameter values are the same as in Table 1, except for the addition of $l_3$=0.5 mm and $w_3$=0.8 mm.

For validation, the proposed mm-wave VP endfire ME-dipole antenna was fabricated and tested. Notably, due to the bandwidth limitation of the feeding waveguide, the test was conducted in two separate frequency bands. Specifically, a probe-fed WR-22 rectangular waveguide was used to measure the band of 35-50 GHz (U-band), while a WR-15 rectangular waveguide was used to measure the band of 50-70 GHz (V-band). Each rectangular waveguide was connected to the SIW structure of the antenna via a broadband transition which was designed for its respective frequency band. In this application, the reflection coefficients of the prototypes were tested by a N5247A Network Analyzer, and the far-field radiation performances were obtained using a Robotic Antenna Far-field System.

Figure 15:
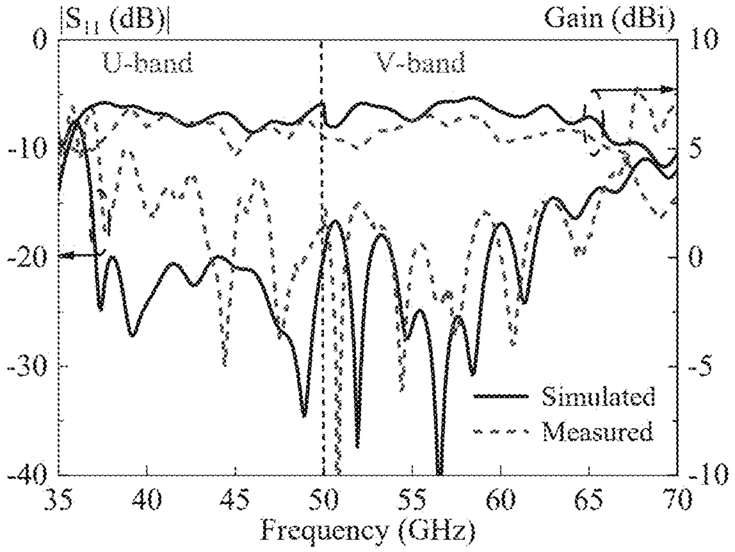
FIG. 15 shows the simulated and measured reflection coefficients and endfire gains of the U-band and V-band prototypes.
Figure 16:
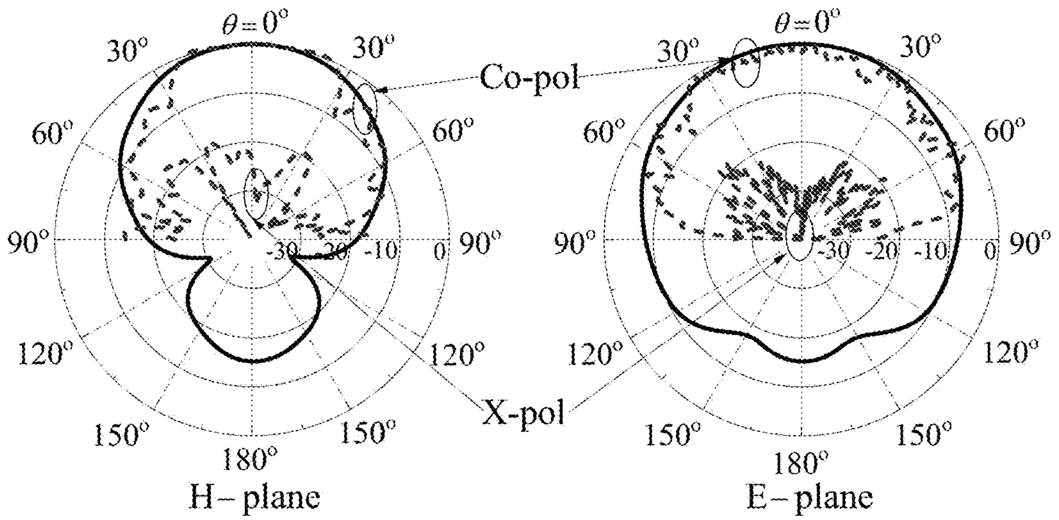
FIG. 16(*a*) shows the normalized radiation patterns of the U-band prototype at 40 GHz.
Figure 16:
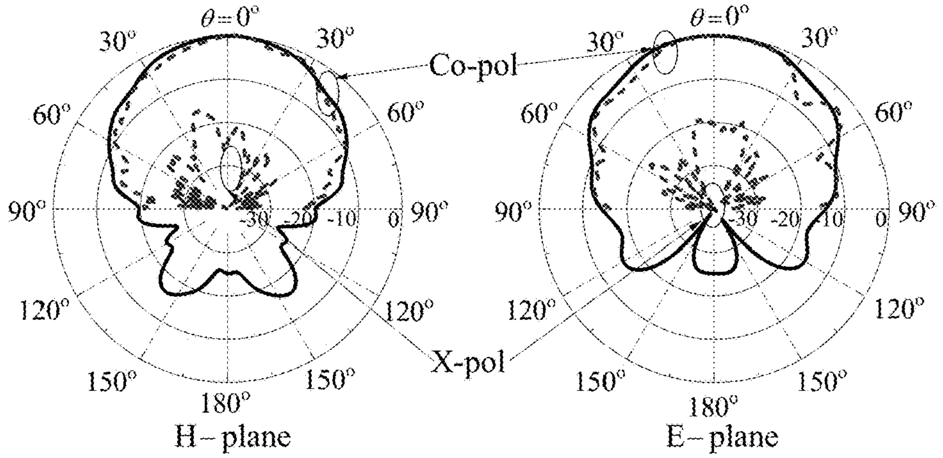
Figure 16:
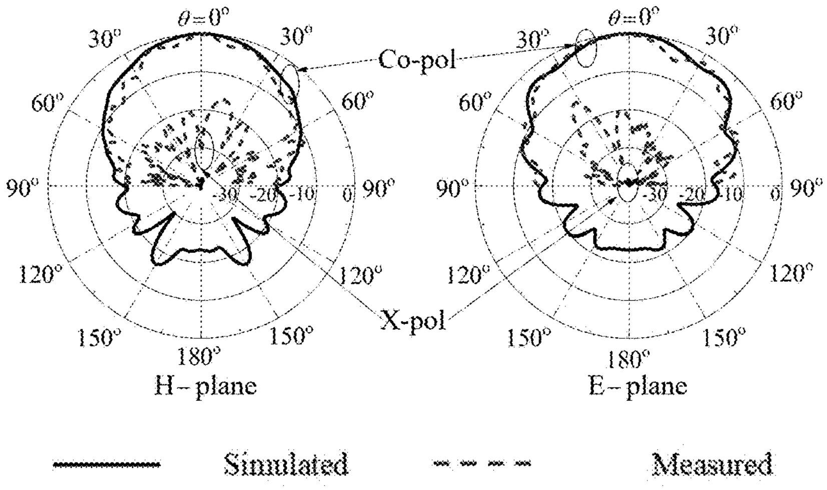

The simulated and measured reflection coefficients and endfire gains of the U-band and V-band prototypes are given in FIG. 15, which shows reasonable agreement between simulation and measurement. The measured −10-dB impedance and 3-dB gain bandwidths are 57.3% (37.2-67.1 GHZ) and 62.7% (35-67 GHZ), respectively. Additionally, within the operating band, the measured peak (average) gain reaches 6.9 dBi (5.8 dBi). FIG. 16(*a*) shows the normalized radiation patterns of the U-band prototype at 40 GHz. FIG. 16(*b*) shows the normalized radiation patterns of the V-band prototype at 50 GHz. FIG. 16(*c*) shows the normalized radiation patterns of the V-band prototype at 60 GHz. Notably, since the far-field measurement can only be performed within an elevation angle of ±90°, the results in the lower half-space are not provided. In the upper half-space, the measured results also agree reasonably well with the simulated ones, and the measured cross-polarization levels in the H-plane and E-plane are lower than −25 dB near the endfire direction.

Figure 17:
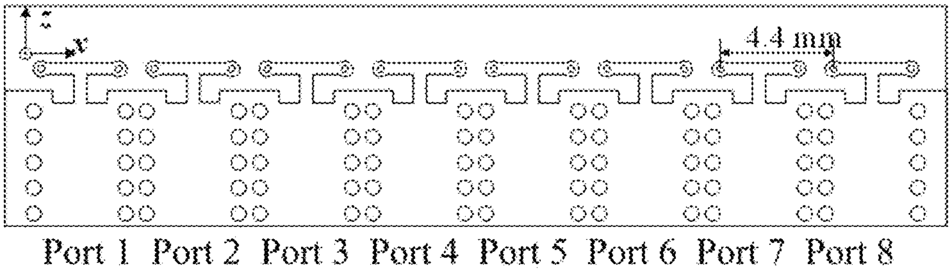
FIG. 17 is a schematic diagram of a 1×8 linear antenna array.
Figure 18:
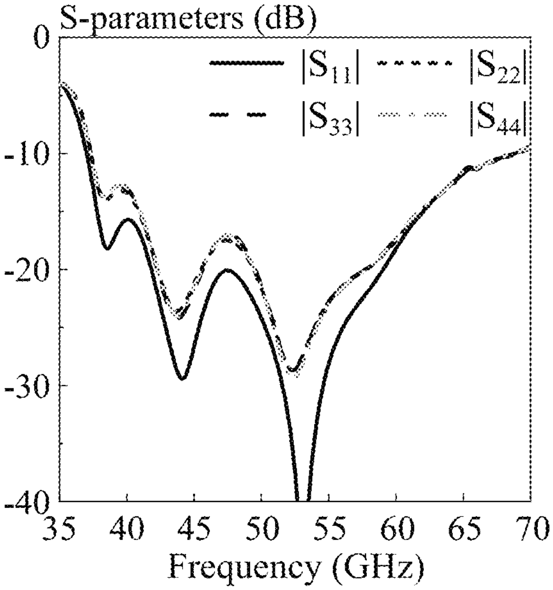
FIG. 18(*a*) shows the simulated reflection coefficients of Ports 1-4.
Figure 18:
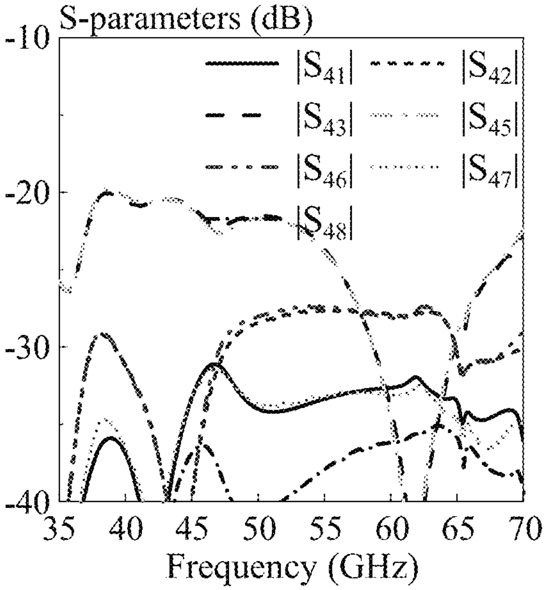

Based on the unifying inventive concept, the present application also discloses an antenna array comprising a plurality of antennas as described in the preceding item arranged in a row, all antennas being realized based on the same single-layer dielectric substrate 1. Next, using the proposed antenna element as shown in FIG. 1, a 1×8 linear antenna array is further designed and tested. The configuration of the proposed 1×8 linear ME-dipole array is shown in FIG. 17. Notably, all the parameters of the antenna element remain the same as those given in TABLE I, and the element spacing is set to 4.4 mm (approximately 0.54/at the lowest operating frequency 37 GHZ). FIG. 18(*a*) shows the simulated reflection coefficients of Ports 1-4 (the results of Ports 5-8 are the same as those of Ports 1-4 due to the symmetry of the array). It can be observed that the array achieves good impedance matching in a broad frequency range of 37.3-68.8 GHz, and the −10-dB impedance bandwidth is given by 59.4%, which is comparable to the previously studied ME-dipole antenna element. Moreover, good isolation is exhibited between elements. As shown in FIG. 18(*b*), the mutual coupling levels between Port 4 and other ports are below −20 dB in the whole operating frequency band.

Figure 19:
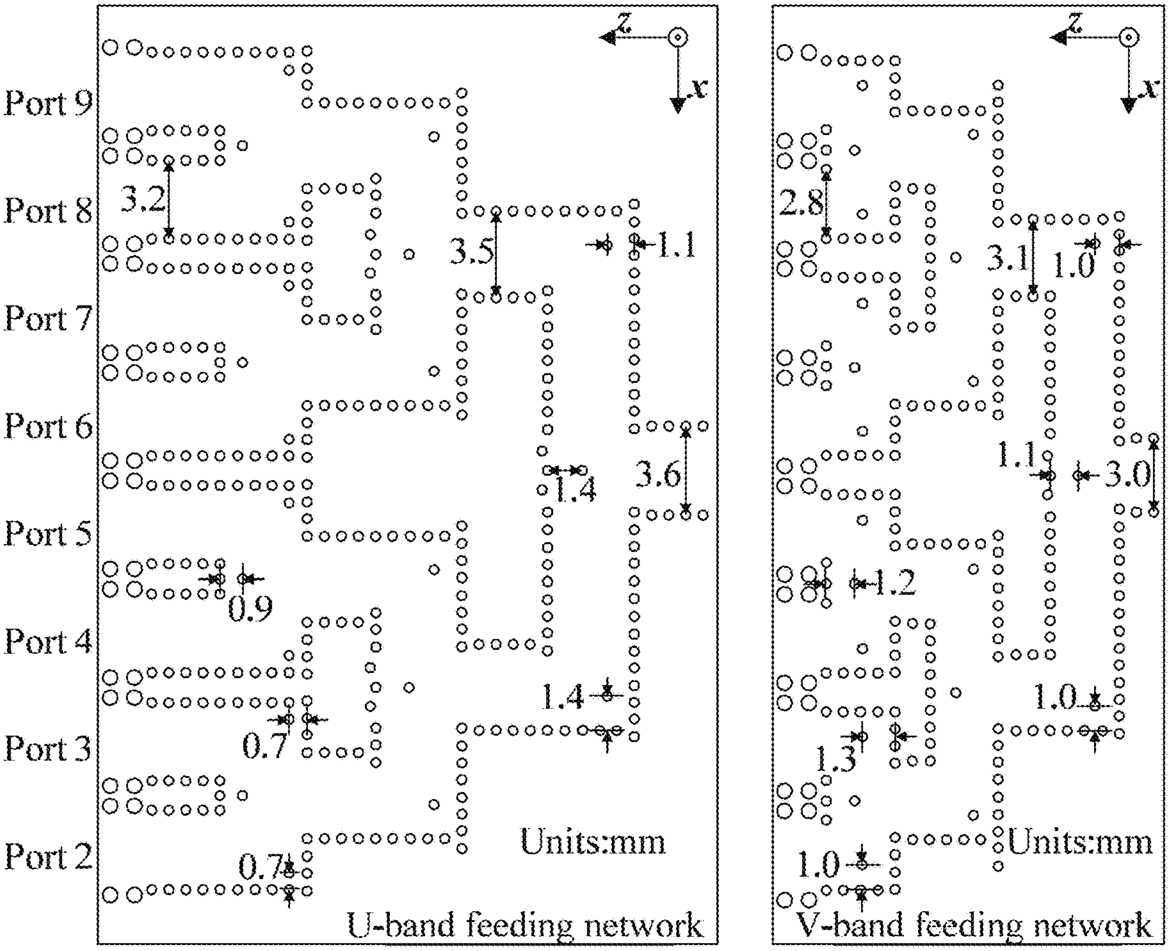
FIG. 19(*a*) shows the geometry of SIW 1-8 feeding networks used for U-band.
Figure 20:
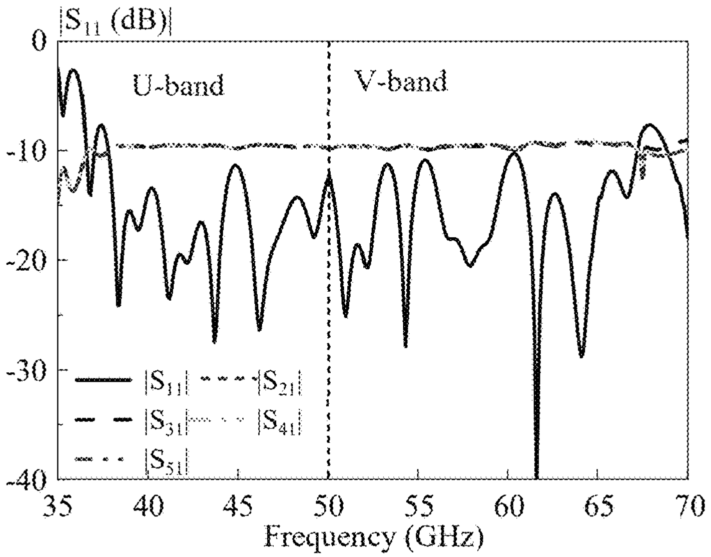
FIG. 20 shows the simulated S-parameters of the U-band and V-band SIW 1-8 feeding networks.

In order to test the performance of the proposed array across the entire broadband range, two different SIW-based 1-8 feeding networks with equal amplitude and same phase are respectively devised for U-band and V-band measurements, as shown in FIG. 19(*a*) and FIG. 19(*b*), with detailed dimensions provided. Notably, the series metallic vias in the SIW feeding networks have the same diameter of 0.3 mm and spacing of 0.5 mm. FIG. 20 shows the simulated S-parameters of the feeding networks for both bands. Again, only partially representative results are presented here due to structural symmetry. As can be seen, in the frequency band of 37.2-67.3 GH, the reflection coefficient is lower than −10 dB and the transmission coefficient from the input port to each output port is around −9.5 dB, indicating a low insertion loss of about 0.5 dB.

Figure 21:
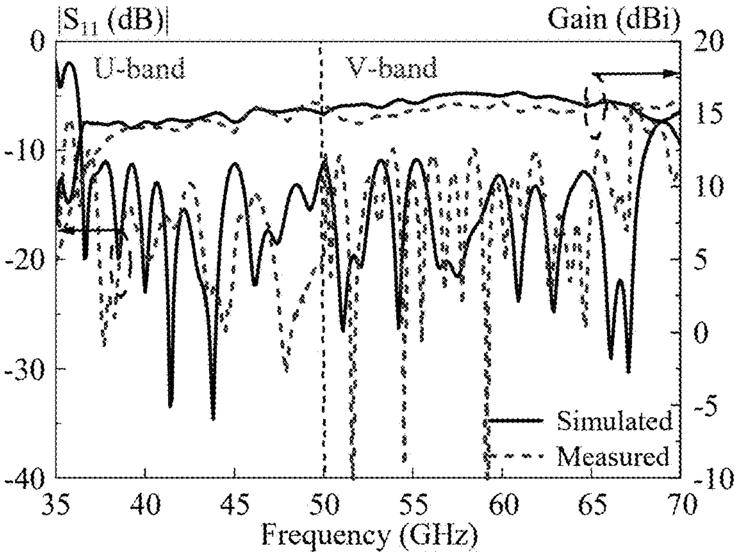
FIG. 21 shows the simulated and measured performance of the U-band array prototype and the V-band array prototype.

For validation, two prototypes of the U-band and V-band arrays with SIW feeding networks were fabricated and tested. Notably, the waveguide-to-SIW transitions of the array prototypes used the same dimensions as those of the antenna-element prototypes in Section II-F. The feeding connectors and test environments were also the same as described in Section II-F. FIG. 21 shows the simulated and measured reflection coefficients and endfire gains of the U-band and V-band array prototypes. As can be observed, the total measured −10-dB impedance bandwidth is 59.9% (36.1-67 GHz), agreeing well with the simulated bandwidth of 60.5% (36.4-68 GHZ). Also, the measured and simulated gains are consistent with each other, having a difference of about 0.5 dB which is reasonable considering the fabrication tolerance and measurement imperfections. Moreover, both the measured and simulated gains are very stable across the operating band. The measured peak (average) gain is 15.8 dBi (14.9 dBi) with a small fluctuation of ~2 dB in the operating band, while the simulated peak (average) gain is 16.4 dBi (15.4 dBi) with a fluctuation of ~1.5 dB.

Figure 22:
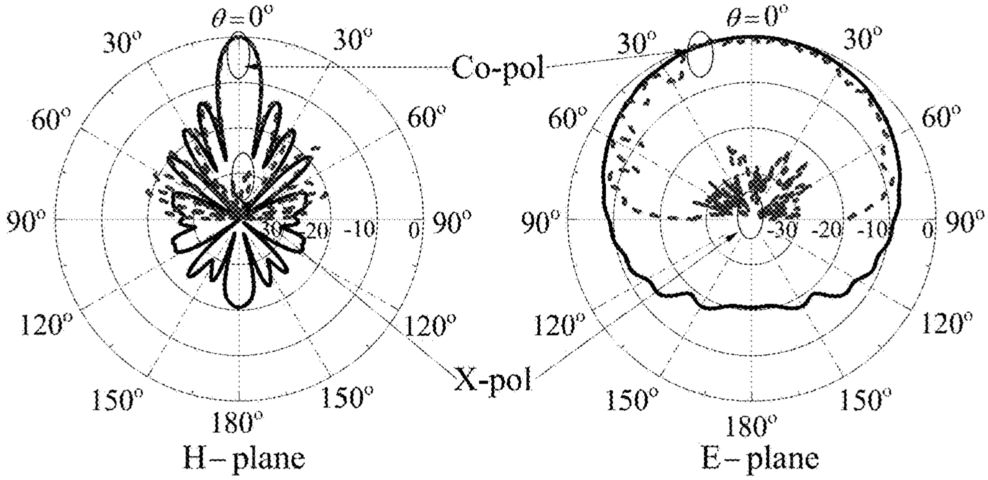
FIG. 22(*a*) shows the normalized radiation patterns of the U-band array prototype at 40 GHz.
Figure 22:
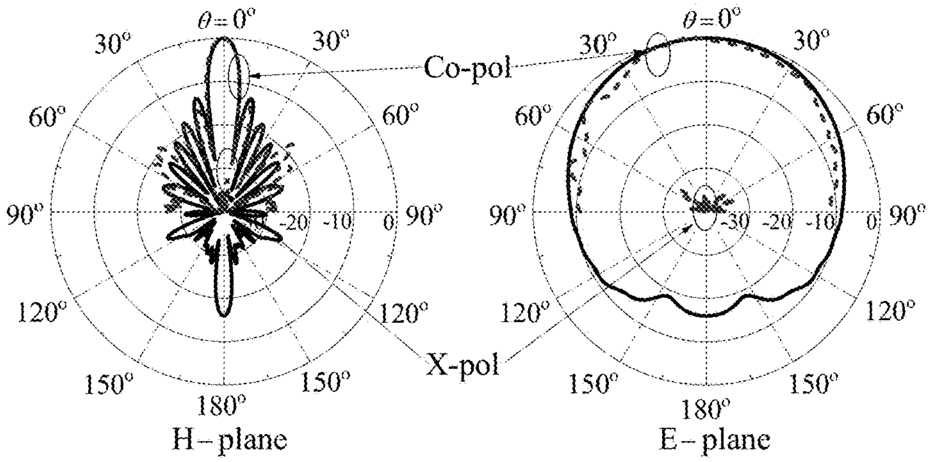
Figure 22:
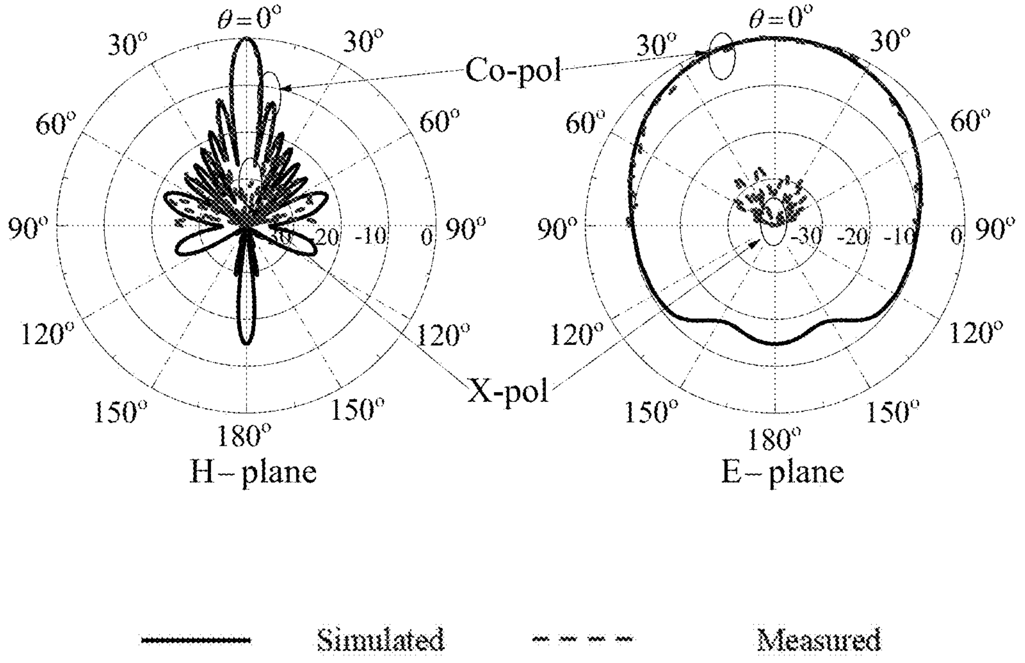

FIG. 22(*a*) shows the normalized radiation patterns of the U-band array prototype at 40 GHz, FIG. 22(*b*) shows the normalized radiation patterns of the V-band array prototype at 50 GHz and FIG. 22(*c*) shows the normalized radiation patterns of the V-band array prototype at 60 GHz. Again, due to the same reason as mentioned above, the measured results are only provided in the upper half-space. As expected, the fan-shaped pattern remains almost unchanged in the E-plane with a half-power beamwidth (HPBW) of 92°, while the pattern in the H-plane is significantly narrowed with the HPBW less than 10°. The side-lobe levels at 40, 50, and 60 GHz are all lower than −13 dB, and moreover, a cross-polarization level of below −30 dB is obtained in the endfire direction. These results indicates that the proposed array features excellent and stable endfire radiation performance.

To further exhibit the advantages of our design, a comprehensive comparison between the proposed and the previously reported mm-wave VP endfire ME-dipole antennas/arrays is provided. The previous designs obtained a bandwidth of over 59%, but both required using four layers of dielectric substrates and suffered from a high profile of ~$0.55\lambda_0$. Although some design just used two layers of dielectric substrates and its profile was reduced to $0.19\lambda_0$, the radiation pattern was titled due to the asymmetric antenna structure and a relatively poor cross-polarization level of −10 dB was resulted.

What's more, in all the previous designs, to improve the FTBR performance, an extra reflector structure was utilized, which undesirably increased the structural and design complexity of antenna/array. By comparison, using just one layer dielectric substrate with a low profile of $0.28\lambda_0$, our proposed antenna/array obtains a very competitive operating bandwidth of approximately 60% and outstanding radiation performance such as stable endfire gain (5.8 dBi/14.9 dBi) and low cross-polarization level (−25 dB/−30 dB). Moreover, no complex parasitic element or reflector is required, the design of the proposed antenna/array is thus very simple.

It has been shown that by simply connecting a SI metallic loop structure with a SIW aperture via a section of parallel-strip line, the former acts as a complementary ME-dipole, and a superior overall performance including a broad bandwidth of 57.3%, a peak gain of 6.9 dBi, a high FTBR of over 25 dB, and a low cross-polarization level of around −40 dB can be achieved simultaneously. Moreover, based on this element, a high performance 1×8 linear ME-dipole antenna array has also been designed, fabricated, and measured, yielding a broad impedance bandwidth of 59.9% and a stable gain of around 14.9 dBi. Due to the great advantages such as simple structure, low profile, broad bandwidth, and stable radiation performance, the proposed single-layer VP endfire ME-dipole antenna and array should have great application prospects in various mm-wave systems.

Note that when a component is referred to as 'fixed to' another component, it may be directly on or centered within the other component. When a component is described as 'connected to' another component, it may be directly attached to it or also centered within it. Terms such as 'vertical,' 'horizontal,' 'left,' 'right,' and similar expressions used in this document are for illustrative purposes only.

Unless otherwise defined, all technical and scientific terms used herein have the same meaning as commonly understood by those skilled in the art to which this application belongs. The terms used in this specification to describe specific embodiments of the application are intended solely for the purpose of describing those particular embodiments and are not intended to limit the application.

The terms 'first,' 'second,' and similar ordinal terms used in conjunction with elements can be used to describe various components, but such elements are not limited by these terms. The use of these terms is solely for distinguishing one component from another. For example, without departing from the scope of the application, the first component can be named as the second component, and similarly, the second component can be named as the first component.

The embodiments of the present application have been described above in conjunction with the accompanying drawings, but the application is not limited to the specific embodiments described above. The above specific embodiments are illustrative and not restrictive; various changes and modifications may be made by those skilled in the art without departing from the scope and spirit of the application as set forth in the claims.

The invention claimed is:

1. A single-layer broadband vertically polarized endfire magnetoelectric dipole antenna, for millimeter-wave applications, wherein, the antenna comprises a substrate-integrated closed loop (2) as a main radiator of the antenna, a substrate integrated waveguide (4) for feeding, two parallel-strip lines (3) for connecting the substrate-integrated closed loop (2) and the substrate integrated waveguide, the substrate-integrated closed loop (2), the substrate integrated waveguide (4) and the parallel-strip lines (3) are arranged in one single layer dielectric substrate (1);

the substrate-integrated closed loop (2) is a magnetoelectric dipole structure composed of two horizontal metallic strips (21) and a pair of first vertical metallic vias (22), the pair of first vertical metallic vias (22) extend vertically along the thickness direction of the substrate (1), the two horizontal metallic strips (21) are symmetrically disposed on upper and lower surfaces of the substrate (1), each of the first vertical metallic vias (22) is connected between an upper and lower directly opposite ends of the two horizontal metallic strips (21), each of the horizontal metallic strips (21) is connected to the substrate integrated waveguide (4) through one of the parallel-strip lines (3);

excited by the two parallel-strip lines (3), the first vertical metallic vias (22) function as electric dipoles while a radiation aperture of the entire substrate-integrated closed loop (2) is equivalent to a magnetic dipole, generating endfire radiation.

2. The single-layer broadband vertically polarized endfire magnetoelectric dipole antenna according to claim 1, wherein, the substrate integrated waveguide (4) connected with the parallel-strip lines (3) serves as feeding and a backed cavity for enhancing the front-to-back ratio of the antenna.

3. The single-layer broadband vertically polarized endfire magnetoelectric dipole antenna according to claim 2, wherein, the substrate integrated waveguide (4) comprises two metallic layers of apertures (41) provided on the upper and lower surfaces of the substrate (1) and two rows of second vertical metallic vias (42) connected between the two layers of the apertures (41);

the thickness direction of the substrate (1) is defined as a y-axis direction, a z-axis direction, a x-axis direction and said y-axis direction are two and two perpendicular to each other, an extension direction of the horizontal metallic strips (21) and an extension direction of the apertures (41) close to a boundary of the horizontal metallic strips (21) are all parallel to the x-axis direction; an extension direction of the parallel-strip lines (3) and an arrangement direction of each row of the second vertical metallic vias (42) are parallel to the z-axis direction; the two rows of the second vertical metallic vias (42) are spaced apart and aligned in the x-axis direction; the z-axis direction is perpendicular to the x-axis direction and both are perpendicular to the y-axis direction; the parallel-strip lines (3) are connected to a center position of the horizontal metallic strips (21).

4. The single-layer broadband vertically polarized endfire magnetoelectric dipole antenna according to claim 3, wherein, the boundary of at least one of the apertures (41) is recessed towards a facing direction departing from the horizontal metallic strips (21) to form a pair of rectangular slots (410) located on both sides of a respective one of the parallel-strip lines (3) to further enhance the front-to-back ratio and cross-polarization performance of the antenna.

5. The single-layer broadband vertically polarized endfire magnetoelectric dipole antenna according to claim 4, wherein, two side edges of the respective one of the parallel-strip lines (3) parallel to the z-axis direction are flush with inner side edges of the rectangular slots (410), the inner side edges being the side edges of the rectangular slots (410) parallel to the z-axis direction and close to the other rectangular slots (410).

6. The single-layer broadband vertically polarized endfire magnetoelectric dipole antenna according to claim 3, wherein, the horizontal metallic strips (21) as well as the parallel-strip lines (3) are each symmetrical about a first plane, the first plane being a plane of symmetry between two rows of the second vertical metallic vias (42).

7. The single-layer broadband vertically polarized endfire magnetoelectric dipole antenna according to claim 3, wherein, a length of the horizontal metallic strips (21) in the x-axis direction is equal to twice the height of the first vertical metallic vias (22) in the y-axis direction.

8. An antenna array, comprising multiple antennas as claimed in claim 1, wherein the multiple antennas arranged in a row on the same single layer dielectric substrate (1).

* * * * *